Patented Aug. 18, 1936

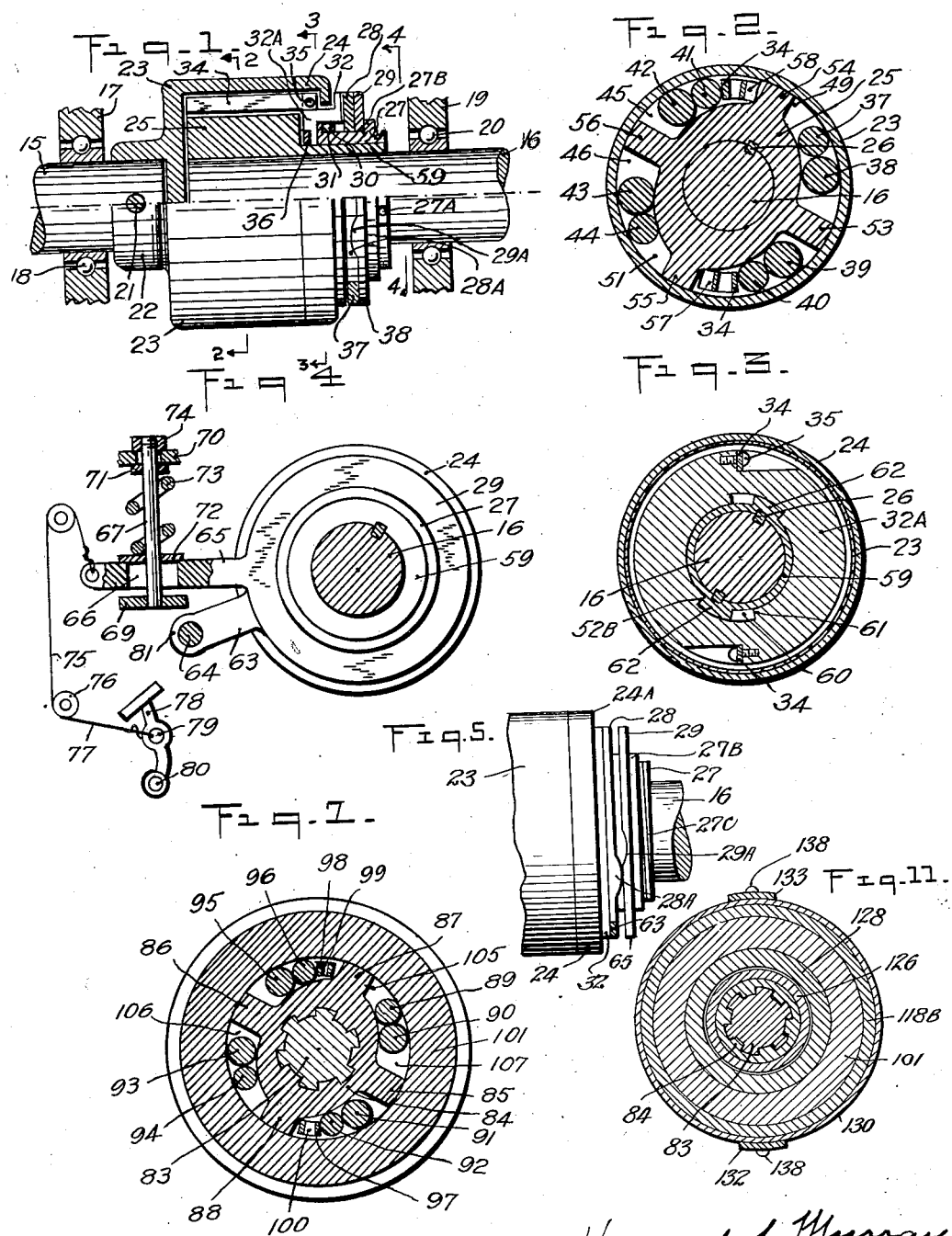
Aug. 18, 1936.   H. J. MURRAY   2,051,385
FREEWHEELING SYSTEM FOR VEHICLES
Filed May 27, 1931   2 Sheets-Sheet 1

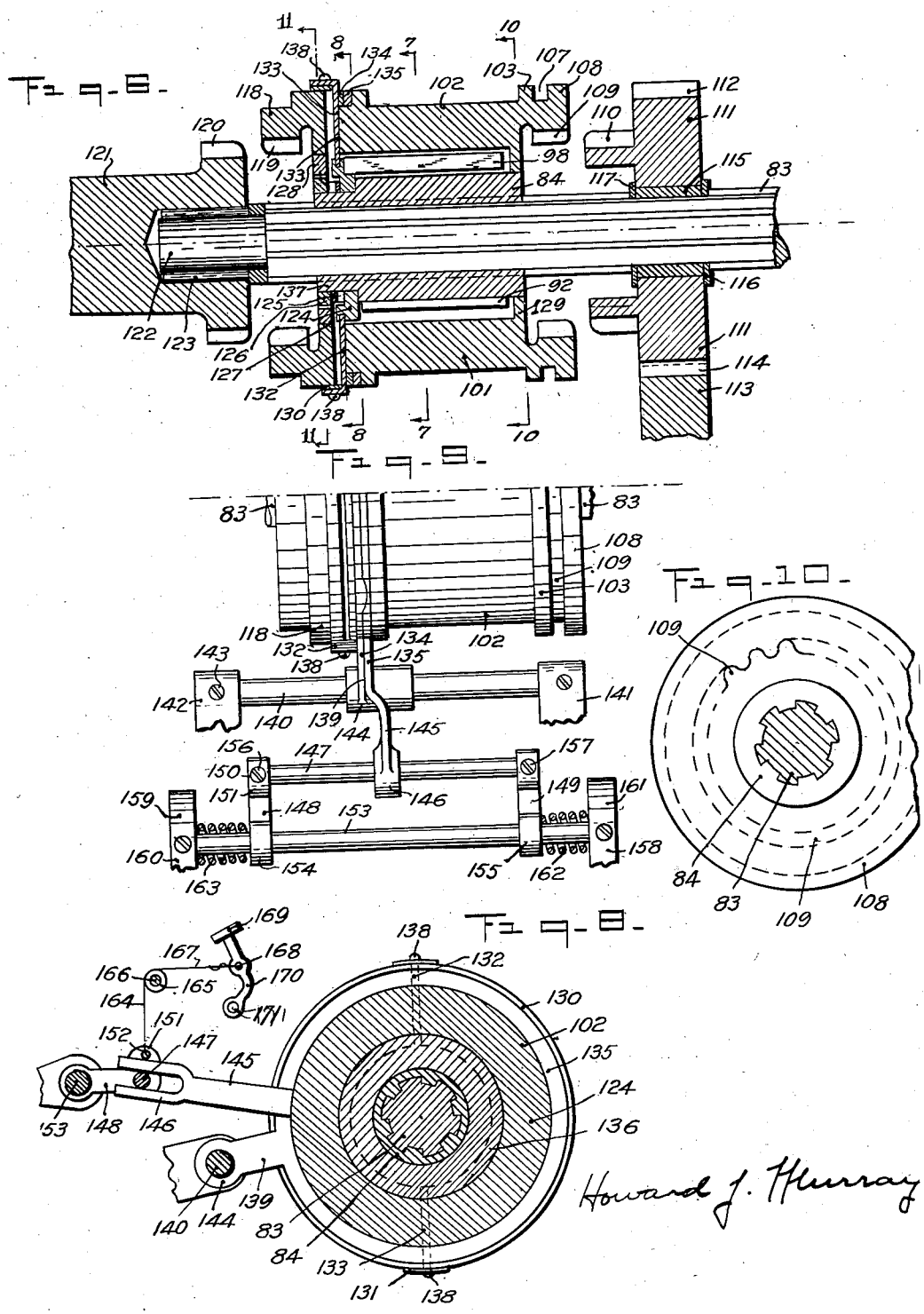

2,051,385

UNITED STATES PATENT OFFICE 2,051,385

FREE-WHEELING SYSTEM FOR VEHICLES

Howard J. Murray, New York, N. Y.

Application May 27, 1931, Serial No. 540,288

24 Claims. (Cl. 192—48)

My invention relates in general to a simple device for affecting the driving relations of a pair of power transmitting members.

One of the general objects of my invention is to provide means whereby a driving member may be automatically connected to a driven member when the flow of power is in one direction, and selectively connected when the flow of power is in the opposite direction.

Another object of my invention is to provide a double acting clutch organization whereby a clutch automatically acts in one direction in accordance with the speed relations of its movable elements and in the opposite direction in accordance with the manually controlled status of certain other of its movable elements.

Still another object of my invention is to provide means whereby a driving member may be manually placed in driving relation to a driven member in accordance with the operative status of a vehicle brake mechanism.

A further object of my invention is to provide a vehicle free wheeling system by means of which the flow of power in one direction will be automatically controlled by the motive power of the vehicle and the flow of power in the opposite direction will be controlled by the manual operation of the vehicle brake mechanism.

An additional object of my invention is to provide two automatic clutches whereby one of the clutches may be normally operative while the other of the said clutches is inoperative.

A still additional object of my invention is to provide a double acting clutch mechanism whereby power may be automatically transmitted from a driving element to a driven element, and selectively from a normally driven element to a normally driving element.

The invention also contemplates the co-operative association of a vehicle power transmission mechanism and a brake mechanism whereby the status of the power transmission will be varied due to the operation of the brake mechanism.

In the following description names will be given to parts for convenience of expression, but the names are intended to be as generic in their application to similar parts as the art will permit.

The invention allows numerous physical embodiments and two different types are herein illustrated for the purpose of showing the wide application of the invention, but it is understood that the showings in the drawings are largely diagrammatic merely being sufficient in detail to show applications of the invention.

In the drawings:

Figure 1 is a fragmentary view of part of a power transmission equipped with an embodiment of the inventive features as disclosed in this application.

Fig. 2 is a transverse sectional view taken along the line 2—2 of Figure 1.

Figure 3 is a transverse sectional view taken along the line 3—3 of Figure 1.

Figure 4 is an enlarged view partly in sectional elevation taken along the line 4—4 of Figure 1, and shows the details of the camming means for releasing one of the clutching portions from an inactive status.

Figure 5 is a side view of the camming means of Figure 4.

Figure 6 is a fragmentary view of part of a power transmission equipped with a modification of the inventive features shown in Figure 1.

Figure 7 is a transverse sectional view taken along the line 7—7 of Figure 6.

Figure 8 is a transverse sectional view taken along the line 8—8 of Figure 6.

Figure 9 is a top view of the means shown in Figure 8 with the manual control means omitted.

Figure 10 is a view taken along the line 10—10 of Figure 6.

Figure 11 is a sectional view taken along the line 11—11 of Figure 6 in the direction indicated by the arrows.

Referring to the drawings there is shown in Figure 1 a power shaft 15 connected to a source of power supply such as an internal combustion engine as commonly found on automotive vehicles, and a shaft 16 hereinafter designated as the normally driven shaft and connected to drive the wheels of the said vehicle. The shafts 15 and 16 are positioned in axial alignment by means of the bearings 18 and 20 suitably positioned in the supporting members 17 and 19. Keyed to the normally driving power member 15 is a tubular member 23 provided with a hub extension 22 designed to be keyed to the shaft 15 by means of the pin 21 so that a movement of the driving shaft 15 will thereby cause the tubular member 23 to rotate therewith. A tubular member 25 is rigidly keyed to the normally driven shaft 16 by means of a key 26. This tubular member 25 is formed with symmetrically positioned spoke like projections 53, 54, 55 and 56 having curved external surfaces arranged to receive the tubular projection 23. A flanged element 27 is fitted on to the tubular member 25 and secured to same by means of the pin 27—A. This element 27 is formed so as to receive two disc shaped control members 28 and 29 provided with a male cam 28—A forming part of the disc element 28, and a female cam recess 29—A forming a part of the disc element 29. A screw-threaded end member 27—B is formed so as to be received by a threaded portion of the element 27 so as to adjustably secure the threaded member 27—B to the member 27 and thereby adjustably compress a seating element in the form of a spring 30. This spring 30 in turn will thus be caused to hold the members 28 and 29 against each other in desired operating relation.

An irregularly disc shaped element 32 with a flanged hub extension 32—A is formed so as to rotate upon the cylindrical member 25 and to have a limited freedom of axial movement when moved to the left by the force imparted by the cammed member 28 thereby to compress the spring 36 designed to reposition the element 32 when the pressure of the cammed element 28 is released.

A pair of clutch element retainers 34 is attached to the element 32—A by means of the screws 35 received by a threaded portion constituting tapped holes formed in the element 32—A so as to be rigidly attached thereto and to rotate therewith.

The method of mounting and positioning the retainers 34 may be more clearly seen by reference to Figure 2 which shows the arrangements of the elements of Figure 1 taken at the section indicated by the line 2—2. The tubular member 25 is formed as shown so that movable clutching elements such as 37, 38, 39, 40, 41, 42, 43, and 44 are moved into operative positions by the relative movement of the driven member 16 and the driving member 15 and the flange extension 23. It should be noted that the engine or source of power of the vehicle upon which the device is to be mounted normally rotates in a counter clockwise direction when looking in the direction indicated by the line 2—2 of Figure 1. Thus it will be obvious that the flanged extension portion 23 will rotate in a counter clock-wise direction. Let it now be assumed that the vehicle is still, the engine running, the conventional clutch "in" and all other parts of the line of transmission between the source of power such as the engine and the rear wheels of the said vehicle are connected. Thus the shaft 16 and its tubular member 25 will be stationary and the element 23 rotating in a counter clock-wise direction. In this event the clutching elements 37, 38, 44 and 43 will be moved into position to connect the elements 23 and 16 in a clutching relation, and thus motion will be imparted to the driven shaft 16 from the element 23 through the clutching means 37, 38, 43 and 44 to the member 16.

The shaft 16 may therefore be increased in its rate of rotation, and the speed of rotation of the element 23 may be decreased either by the decrease in the supply of power to the shaft 15, or for many other reasons. If the driven shaft is given a higher speed of rotation than the element 23, the clutching portions 37, 38, 43 and 44 will be moved out of a clutching position so that no power will be imparted in the reverse direction or from the driven shaft 16 to the normally driving element 23, or a free wheeling condition will exist.

According to the present invention it is proposed to cause the means actuating the brake mechanism of the vehicle to automatically prevent the free wheeling condition as above described and to connect the normally driven member 16 which has become the driving element with the element 23 and thus connect the rear wheels to the engine as a function of applying the brakes to the vehicle. It is further proposed according to the present invention to provide means which will cause the change in the normal free wheeling operation without any mental or additional physical effort on the part of the operator of the said vehicle.

The method of providing this means may be clearly seen by reference to Figures 1 and 2 wherein a double acting over-running clutch is provided. When the normal forward driving clutch elements 37, 38, 43 and 44 have been released as herein described, it is obvious that they cannot be again placed into operation so long as the member 16 rotates at a faster rate of speed than the member 23. Thus with a single acting clutch it is not possible to change the free wheeling operation.

Referring again to Figure 2 there is shown clutch elements 41, 42, 39 and 40 which are arranged to be placed into clutching relation when the normally driven element 16 is operating in a counter clock-wise direction at a faster rate of speed than the normally driving element 23. It is obvious that these clutch elements would work at any and all times, that the speed of the normally driven member 16 exceeded that of the element 23. Thus with the arrangement shown with Figure 2 there could be no free wheeling. However, if the clutching elements 41, 42, 39 and 40 are prevented from coming into operation, then the condition of free wheeling would continue as though the said elements 39, 40, 41 and 42 were absent. The means for restraining or preventing the operation of these elements is shown as the barriers 34 connected to the irregularly formed disc member 32—A rotating on the hub extension of the tubular member 25. These barriers 34 rotate about the common axis with the member 32 when the said member 32—A is manually operated thereby to cause it to move axially against the compression of the spring 36 into clutching engagement with the friction face 24—A of the end member 24 rigidly attached to the normally driving element 23. This may be more clearly seen by reference to Figure 5. The actuation is caused by the relative rotation of the cam members 28 and 29 about the element 27 due to the movement of the control arm 65 as will be clearly seen by reference to Figure 4.

A connection 77 is made at the point 79 of a conventional brake lever 78 mounted on a shaft 80. This connection may be attached to a lever or arm 65 forming a portion of the cam disc member 29 to rotate same (say) in a clock-wise direction relative to the stationary cammed element 28, also provided with an arm 63 having an enlargement 81 designed to surround the shaft 64 in a slidable manner.

The arm 65 of the cammed disc 29 is provided with an opening 66 through which a stationary rod 67 may pass. This rod 67 is provided with a tight fitting washer portion 71 so that it may be securely fastened to a stationary portion of the vehicle 70 by means of the nut 74. A slidable spring stop 72 is so formed as to provide a seat for the spring 73 whereby the compression of the said spring may thereby act through the said seat 72 against the arm 65 so as to return the arm 65 to the stop 69 and thereby place the cammed member or disc 29 in an inoperative position.

Now the arm 65 as shown in Figure 4 is assumed to be in an operative position and thus the two cammed elements 28 and 29 have been moved relative to each other as shown in Figure 5 and the male cam 28—A has moved out of the female cam 29—A and thereby imparted an axial movement to the cammed disc 28 so as to move it against the opposition of the spring 30 positioned by the end flanged portion 31 of the tubular member 27. It is obvious however that the continued movement of the cammed member such as 28 will bring it into contact with the control member 32 in turn to move the said member 32 against its positioning spring 36 thereby to eventually cause the control member 32 to be forced against the frictional surface 24—A as shown in Figure 5. But the member 16 is moving faster in a counter clock-wise direction than the normally driving member 23 during a free wheeling condition. Thus the element 32 and the friction member 24—A have relative motion and thus the member 32 will tend to be retarded to the speed of the friction element 24—A. Such action will rotate the member 32 about the hub extension 59 of the tubular member 25 and the barriers 34 will thus be rotated to compress the springs 58 and 57 and away from the clutching rollers such as 40 and 41 so as to release same from an unclutching or inoperative position.

It should now be evident that the normally driven element 16 will promptly be connected with the normally driving element 23 to impart power to same, and thus the free wheeling condition will no longer exist. By the means provided according to this disclosure, it is evident that the vehicle may be connected to the source of power by the operation of the conventional brake lever, and that as long as the brake lever is not operated, the condition of free wheeling will normally continue to exist.

If the brake lever is returned to an inoperative position the cammed elements 28 and 29 will be returned to their normally inoperative position. This is true because when the manual pressure is removed from the connection 77, the power compressed in the spring 73 will act to move the spring seat 72 downward along the rod 67 thereby moving the lever 65 to reseat the cams 28—A and 29—A as shown in Figure 1. If the normally driven element 16 is still rotating at a faster rate of speed than the normally driving element 23, free wheeling conditions will again be obtained.

Figure 3 indicates a sectional elevation of the means of Figure 1 at the section indicated at the line 3—3 and is shown mainly to illustrate the means for definitely locating the barriers 34 in a certain inoperative position. The member 32—A is shown positioned on the hub extension 59 formed with stop elements 62 so that the disc member 32 will be pushed back in a relatively counter clock-wise direction by the springs 57 and 58 which were compressed in the unlocking operation until the shoulder portions 52—B of the element 32 come to rest against the stop elements 62 of the hub extension 59 of the tubular member 25. Thus the barriers are always positively positioned so that the clutching elements 39, 40, 41, and 42 cannot possibly move into a clutching position unless intentionally so moved by the operator of the vehicle in the normal act of applying the brakes to the same.

The plates or barriers 34 thus act as a lock or resistor to the engagement of the clutching elements such as 39, 40, 41 and 42. According to the present disclosure, I have provided means to selectively control the flow of power from the wheels of a movable vehicle to the engine, whereby the wheels and the engine may be connected at will during a condition of free wheeling. I have also provided a device which will normally bring about a free wheeling status, and in addition additional means controlled by the action of some conventional manually actuated part of a movable vehicle such as a brake-pedal to discontinue the free wheeling as a co-incidental act in the normal operation of the car.

Referring to Figure 6 there is shown a modification of the invention as disclosed by the means shown in Figure 1 under conditions wherein it is desired to move the clutching elements along a splined shaft so as to effect change speed conditions of a power transmission system forming a portion of a moving vehicle. The shaft 121 may be considered as the engine shaft and ends in a tooth portion 120 provided with a recess designed to receive an extension bearing portion 122 of the splined shaft 83. The shafts 121 and 83 are assumed to be in axial alignment when the roller bearing 123 is of the proper shape and form. A movable organization which may be generally designated as 102 is provided with a splined member 84 as may be more clearly seen by reference to Figure 7. This splined member 84 is provided with splines and is designed to rotate in unison with the normally driven splined shaft 83 to drive or be driven from the same. The member 84 is so formed as to have four spokes or ribs such as 87, 85, 86 and 88 formed to rotate in a cylindrical outer housing 101 so as to support the said member 101 at all times in concentric relation with the splined shaft 83.

The member 84 is also formed so as to receive a plurality of clutching elements such as 89, 90, 91, 92, 93, 94, 95, 96, which for the purpose of this description may be assumed to be solid cylinders and designed to engage the surfaces of the members 84 and 101 so that one may be driven from the other. The members 89, 90, 93 and 94 may be considered as the elements automatically moved into clutching relation by counter clockwise movement of the element 101 so as to drive the element 84 also in a counter clock-wire direction.

The clutching elements 95, 96, 91 and 92 may be considered as the clutching elements designed to be moved into clutching engagement when the member 84 is rotating counter clock-wise at a faster rate than the element 101 is rotating counter clock-wise.

It should be noted, however, that the clutching elements 96, 95, 91 and 92 are normally prevented from moving into a clutching engagement by the barriers 97 and 98 of Figure 7 in the same manner that the barriers 34 of Figure 1 prevent the clutching elements 41, 42, 39 and 40 of Figure 2 from moving into a clutching engagement.

The only difference in operation between the clutching means of Figure 1 and that of Figure 6 lies in the novelty that the driving and driven elements together with the clutching means may be moved bodily along a shaft in either direction so as to be connected at will to other power elements. The movable means shown in Figure 6 may be manually actuated by a conventional shift finger suitably placed in the shifting slot 107. When the shift finger in the slot 107 is moved so as to cause the member 102 to move to the right the clutch teeth 109 and 110 will be meshed so as to effect a driving relation between the shaft 83 and the gear train 111 and 113 which may be assumed as the second speed gear train.

When the shift finger moves the member 102 to the left, the teeth 119 will be meshed with the teeth 120 and a so called direct drive between the shafts 121 and 83 will be effected. It should be noted, however, that the means for controlling the action of the barriers 97 and 98 will have to move also along the shaft. The method of providing for this movement may be more clearly seen by reference to Figures 8 and 9. The cammed disc elements 134 and 135 as shown on Figures 6, 8 and 9 are provided with extension arms 145 and 139. The arm 139 ends in a flanged hollow member 144 designed to move along the shaft 140 parallel to the axis of the shaft 83 and positioned by supports 142 and 141 forming a portion of the vehicle. The shaft is also held against axial movement by the pins 143. The cammed member 135 is provided with an extension arm 145 arranged with a forked end with fingers 146 in which a shaft 147 may move as it rotates about the axis of the shaft 153 as is clearly shown in Figure 9. Thus the cammed elements 134 and 135 may be bodily moved with the member 102 in either direction, and still remain in an inoperative position, but ready to be operative so as to move the fingers 133 and 132 riding in the radial opening 136 of the member 124 so as to move same to the left against the resistance of the spring 125 into contact with the frictional face 127 of member 128 secured to the member 101 to rotate therewith.

The method of actuating the cammed elements 134 and 135 is shown by Figure 8 in which a connection 167 attached to the pin 168 of the conventional brake pedal 169 may be connected to the rocker arm 148 through the eye 152. As the foot pedal is rotated around its shaft 171, the connection 167 will be pulled over the pulley 165 rotatably supported on the shaft 166 so that the connection portion 164 will lift up the rocker arm 148 against the resistance of the springs 163 and 162.

This action will crowd the disc 134 away from the disc 135 to the left against the fingers 132 and 133 to move same to the left. The fingers 132 and 133 are employed to transmit axial force created by the camming action between the elements 134 and 135 to the member 124 carrying the barriers 98 and 97. The ring-shaped member 130 is slidably mounted on the member 101 to position the said fingers 132 and 133 by means of the rivets 138 and to guide the said fingers as they are moved axially. The main function of the said fingers 132 and 133 is to transmit axial force from the member 134 to the ring-shaped member 124 so as to move the member 124 against its seating spring 125 until it comes in contact with the friction surface 127, whence the barriers 97 and 98 will be moved toward the spoke portions 87 and 88 to compress the springs 99 and 100, thus releasing the clutch elements 95, 96, 91 and 92 from a locked position. If the speed of the shaft 83 is greater than the speed of the portion 101, power will be transmitted from the shaft 83 through the member 84, through the clutch elements 91, 92, 95 and 96, thence to the normally driving element 101. This driving condition will exist as long as the operator continues to depress the brake lever 169 of Figure 8. When the brake lever is released, the springs 162 and 163 will act to rotate the rocker arm 148 in a clockwise direction so as to rotate the arm 145 of the cammed disc member 135 of Figure 6 to reseat the male and female cams so as to bring the elements 134 and 135 together again. This action will cause the fingers 132 and 133 of Figure 8 to be moved back toward the right by the action of the compressed spring 125 so as to disengage the element 124 from the frictional surface 127 and thereby from the member 101. After the element 124 has been moved back by spring 125 the member 124 will no longer tend to rotate with the members 128 and 101 and the springs 99 and 100 will move the barriers 98 and 97 back to their original locking position. This action will occur any time during the movement of the member 102 along the splined shaft 83. In connection with this action it should be noted that the driving power of the moving vehicle represented by its momentum may be selectively employed by depressing the brake pedal to thus connect the car with the supply of power such as an internal combustion engine. This action may occur when the transmission is in a direct drive condition, or any other speed condition. It may also be applied when the vehicle is at rest, and a slight rotation of the shaft 83 will operate same.

The supports 158 and 159 are supposed to be attached to a stationary part of the transmission casing, and the rocker arms 148 and 149 are positioned against axial movement by the screws 156 and 157. The springs 162 and 163 are attached to the arms and to the support members so that any energy caused by the rotation of the rocker arms 148 and 149 may be employed to return same to their initial inoperative position when the manual pressure is released from the brake pedal 169 of Figure 8.

The portion 101 is formed with a flange 129, and a ring 128 is designed to be pressed into the recess of the element 101 with a tight fit. Thus the clutch elements 89 to 96 inclusive are retained in position and the pressure of the shift lever in the slot 107 formed between the flanged portions 103 and 108 may be properly transmitted to move the portion 137 and splined member 84 along the splines.

It should be obvious that a vehicle equipped with such a device will be enabled to obtain the benefits of free wheeling, and yet at the same time also be enabled to employ the compression of the engine to aid in braking the motion of the car as well as to add safety in the normal driving of the car. It should also be noted that it will be possible to leave the car in gear on a hill if means are provided for holding the brake permanently in an operative position, or means are provided for manually operating the control wire 164 so as to cause the rocker arm 148 to be held up in a position to actuate the cam members 134 and 135.

While I have shown and have pointed out certain novel features of my invention, it should be obvious to those skilled in the art that various omissions and substitutions in the form and details of the device as illustrated may be employed by those skilled in the art without departing from the spirit of my invention.

Having thus described my invention, I claim:

1. In a device of the class described, the combination of a driving and a driven element, a plurality of sets of roller clutching means automatically movable into inter-engaging positions when the driven element moves at a faster rate than the driving element, additional sets of roller clutching means movable into inter-engaging position when the driving element tends to move at a faster rate than the driven element, control means for selectively actuating the said first named clutching means, said control means including two cammed disc shaped members mounted about a given axis whereby a rocking movement of one of the said members will impart an axial movement to the other said member, and manually controlled brake actuating mechanism for selectively actuating the control means.

2. In a device of the class described, the combination of a driving and a driven element mounted for relative movement about a common axis, a plurality of clutching means movable into driving relations, certain of said clutching means designed to so move when the driving member tends to rotate at a faster rate than the driven member, and certain other of the said clutching means designed to be selectively actuated by a manually controlled device thereby to become operative to effect a driving relation when the normally driven member becomes a driving member, said manually controlled device including two cammed disc shaped members mounted about the said common axis whereby a rocking movement of one of the said members will impart an axial movement to the other said member, and barrier means for causing the last named clutching means to become inactive when the first named clutching means is active.

3. In a device of the class described, the combination of a driving member and a driven member, roller clutching means for automatically placing the said members in driving relation when the said driving member tends to move at a faster rate than the driven member, additional roller clutching means, said additional clutching means operatively connected to a manually operated vehicle brake controlling device, said connecting means including a plurality of movable barriers mounted for rotation about a common axis and designed to selectively permit the said additional roller clutching means to connect the said members in driving relation when the said driving member is rotating at a slower rate of speed than the driven member, and means also forming a portion of the said connecting means and including two cammed disc shaped members mounted about a common axis whereby a rocking movement of one of the said members equipped with an actuating arm connected to the said brake controlling device will impart axial movement to the other said member.

4. In a device of the class described, a driving and a driven element, clutching means for automatically connecting the driving element to the driven element when the said driving element tends to rotate at a faster rate of speed than the driven element, said clutching means also acting to automatically disconnect the said driving and driven elements when the normally driven element is rotating at a faster rate of speed than the normally driving element, additional clutching means designed to be actuated by manually controlled elements to thereby selectively connect the said driving and driven elements in driving relation when the said normally driven element becomes the driving element to thereby drive the normally driving element as a driven element, means constituting the said manually controlled elements, said means including two cammed disc shaped members mounted for rotatory motion about a common axis, an operating arm attached to one of the said members, and a brake lever, a resilient member designed to normally hold the said arm in an inoperative position, means for connecting the said arm in operative relation to the said brake lever whereby a movement of the said brake lever will operate the said arm, and means for limiting the movement of the said arm.

5. In a device of the class described, a driving member and a driven shaft, a plurality of roller clutching means positioned between the said driving member and driven shaft for connecting the driving member to the driven shaft when its speed exceeds that of the driven shaft and for automatically disconnecting the said shaft and member when the speed of the driven shaft exceeds that of the driving member, a plurality of additional clutching means normally inactive while the first named clutching means are active, said last named clutching means designed to be selectively placed in position to become active to thereby connect the said driving member and driven shaft in driving relation as a function of the relative speeds of the said shaft and member, and means including a common rockable cam actuated axially shiftable clutch releasing means provided with a friction surface and a plurality of fingers for placing the last named clutching means in an active condition.

6. In a device of the class described, a driving element and a driven element, means constituting a double acting clutch, said clutch including two separate sets of roller clutching portions, one of the said sets of roller clutching portions designed to automatically connect said driving and driven elements in driving relation as a function of the difference in speed between the said elements, a second of the sets of roller clutching portions designed to be placed selectively in a condition to become operative due to its co-operative association with a manually actuated brake controlling mechanism including a brake pedal, and means operatively positioned between the said mechanism and said second set of roller clutching portions and including three disc shaped members mounted about a common axis, one of the said members equipped with a friction surface, and the other said members provided with mating cam portions for affecting the operative status of the said last named clutching portions.

7. In a power transmission mechanism forming a portion of a vehicle equipped with a brake pedal, including elements for effecting speed change, means associated with the said speed change elements and including a pair of clutching organizations, one of the said clutching organizations designed to place the power transmission in a driving condition as a result of a difference in speed of the said elements when manually actuated by control means operated from the brake pedal of the vehicle upon which the said transmission mechanism is installed, and the other of the said clutching organizations designed to be automatically actuated when the first named clutching organization is inoperative thereby to also place the said transmission in a driving condition as a function of the difference in speed of the said change speed elements, and disc shaped means mounted in axial alignment with the said change speed elements, and a third disc shaped friction member, including cammed portions constituting a part of the said control means.

8. In a power transmission, including a driving and a driven element, a plurality of clutching means for causing the said elements to assume a driving relation, one of the said clutching means including means designed to place the said elements in the said driving relation as a function of the difference in speed of the said elements, and the other said clutching means including portions designed to be normally inactive except when manually disengaged from a normally inactive status, thereby to become also automatically active and thus engage the said driving and driven elements in a clutching relation, and means including a pair of disc shaped members mounted for rotary movement about the axis of the said driven element and a third disc shaped member equipped with a friction surface arranged to become active due to a relative movement of the said pair for permitting the said manual disengagement.

9. In a device of the class described, a driving and a driven element mounted for relative movement about a common axis, a plurality of sets of roller clutching means for operatively connecting the said driving and driven elements, certain of said sets of roller clutching means including portions automatically actuated as a function of the difference in speed between the said elements, certain other of said sets of roller clutching means including portions automatically operated when manually released from a normally inactive status, and means for manually releasing the said portions from the said inactive status, said means including three disc shaped members rotatively mounted on the said driven element, one of the said members formed with a male cam porton and connected to a manually actuated brake element, a second member formed with a mating female cam portion, and a third of the said members equipped with a friction surface designed to engage with the said driving element when axially moved by the second said disc member.

10. In a free-wheeling power transmission organization including driving and driven elements, a first clutching means for normally permitting automatic free wheeling relations between the said driving and driven elements when the said driven element tends to rotate at a faster speed than the said driving element, a second clutching means, and manually actuated means for selectively causing the said second clutching means to become active and thereby permit the normally driven member to become the driving member and thereby drive the normally driving element as a driven element, said manually actuated means including three disc shaped members mounted on the said driven element, a first of the said members mounted for rotary movement and equipped with an operating lever and a male cam portion, a second of the said members slidably mounted against rotation and equipped with a female cam portion, and a third member designed to be selectively moved axially by the slidable movement of the second named member thereby to become co-operatively associated with the said driving element so as to tend to rotate therewith.

11. The combination with a power transmission including a pair of main shafts in axial alignment, roller clutches on one of said shafts adapted to establish a drive in either direction between said shafts according to the speed relations of the said shafts, one of the said clutches including portions designed to be automatically operative as a function of the difference in speed between the said shafts, and the other of the said clutches including portions designed to be normally inoperative, and to become active when manually released from the said inoperative status thereafter to become automatically active in the manner described for the first named automatically actuated clutch, and means including portions designed to be manually operated thereby to effect the said release, certain of the said portions including a first named disc shaped member equipped with an operating lever connected to a manually operated brake lever and a male cam portion, a second named member mounted for axial movement and formed with a mating cam portion, and a third disc shaped member provided with a friction portion designed to engage a portion of one of the shafts to be rotated thereby as the said third named member is moved axially by the second named member.

12. In a device of the class described, the combination of two members having relative rotary movement about a common axis, said members provided with two separate sets of roller clutch elements each set designed to separately act to cause a driving relation between the said members, one of said sets of clutch elements arranged to act automatically due to a difference in speed of the said members, and the other of said sets of clutch elements arranged to be normally inactive, means constituting a manually operable brake lever, means including a rotatably mounted friction faced disc equipped with a plurality of restraining fingers for releasing the said last named set from the said inactive status, said friction disc means actuated due to its co-operative relation with the said manually controlled brake lever, and means including two cam faced discs provided with cams whereby rotation of one of the said cammed discs will cause axial movement of the other said cammed disc and thus permit the said manual control to thereby actuate the said friction disc and therethrough the said releasing means.

13. In a device of the class described, the combination of two sets of roller clutch elements mounted for rotary motion about a common axis of rotation each set designed to separately place a pair of power transmission members mounted about the said common axis in driving relation, one of the said sets of clutch elements arranged for automatic operation as a result of the difference in speed relations of the said power members, and the other of the said sets of clutches including means also designed for selective operation due to a difference in speed relations of the said members when and as normally released from an inoperative status, means including an axially shiftable friction faced control means including a plurality of restraining fingers for effecting the said release, and means forming a portion of a vehicle brake mechanism for actuating the said control means.

14. In a power transmission mechanism, a driving element, a driven element, a plurality of roller clutching means for connecting the said elements thereby to establish a drive therebetween, certain of the said clutching means including roller portions designed to become automatically operative as a function of the driving relations of the said elements, and the other of the said roller connecting elements also including portions designed to become automatically operative as a function of the driving relations when unrestrained, and manually controlled friction means for selectively releasing the said roller portions from operative restraint, said means including certain portions axially slidable and rotatable relative to each other and to the said driven element and certain other cammed portions connected to manually actuated elements of a vehicle brake control mechanism.

15. In a change speed power transmission device for movable vehicles including a pair of power shafts, a plurality of sets of roller clutching means for placing the said shafts in driving relation, certain of said clutching means designed to be automatically operative as a function of the speed relations of the said shafts, said shafts and said clutching means mounted for relative rotation about a common axis, and projecting finger means for restraining the automatic action of certain other of the said roller clutching means, said restraining means including a manually controlled axially movable element provided with a friction face designed to be axially movable therewith.

16. The combination with a multi-speed power transmission including a pair of power members, one of which includes a plurality of speed changing elements, sets of axially movable roller clutch portions supported by one of the said members and adapted to individually and separately establish a plurality of driving relations between the said members, one of the said sets of clutch portions including elements arranged to be automatically operative as a function of the speed relations of the said members, the other of the said sets of clutch portions including elements designed to be normally inactive and to become automatically active when manually released from the said inoperative status, and manually controlled elements including axially movable frictional means and a plurality of axially movable camming means for effecting the said release.

17. In a free-wheeling power transmission mechanism, a first named set of roller clutching means mounted for rotation about a common axis with driving and driven members and arranged for permitting the said members to assume the same speed when one of the said members tends to exceed the speed of the other member, means constituting the said driving and driven members, an additional set of roller clutching means for selectively connecting the said members in driving relation when the normally driven member tends to become a driving member, a plurality of restraining barrier fingers mounted for rotation about the said common axis and positioned in operative relation to the said additional set of roller clutching means, and remotely positioned manually actuated means including a vehicle brake lever, two cammed disc shaped members, means for connecting one of the disc shaped members to the said lever whereby the movement of the said lever may be employed to selectively move the said fingers and thereby selectively permit the operation of the said additional set of roller clutching means.

18. In a device of the character described, the combination with driving and driven members, of a coupling for said members comprising an abutment member, a cammed member having oppositely disposed cammed surfaces and gripping members in the form of rollers cooperating therewith to act as bidirectional clutches, manually controlled frictionally actuated barrier means in the path of the rollers of one cammed surface to prevent the operation thereof and cause the coupling members to act as a unidirectional clutch and axially shiftable means for connecting a member of the coupling with the driving member.

19. A clutch device for coupling either of a pair of driving members with a driven member, comprising two unidirectional clutches acting in opposition to one another, means for rendering one of said clutches inoperative to cause said clutch device to act as a unidirectional clutch, said rendering means including cam actuated frictional portions for causing said clutch device to act as a bidirectional clutch, said actuation of said frictional surfaces varied in intensity as a function of the speed relations of the said driving and driven members and a shiftable member for connecting said clutch device with either of said driving members.

20. A clutch device for connecting either of a pair of driving members with a driven member, comprising a pair of oppositely disposed unidirectional clutches in the form of rollers, a cammed member positioned to be actuated as a function of the relative speeds of the driving and driven members and a single axially shiftable means operatively associated with the cammed member for connecting one of the members of said clutch device with either of said driving members while selectively maintaining one of said clutches inoperative or operable.

21. In a power transmission mechanism including a plurality of driving members and a driven member mounted for rotation about a common axis, a driving element and a driven element mounted for axial movement on the said driven member, said driving element arranged to be selectively moved into and out of engagement with the said driving members as the said driven element is positively connected to the driven member, a first roller clutch means for automatically connecting the said elements in a unidirectional driving relation when a selected driving member tends to rotate the driving element faster than the driven element and for disconnecting the said connection when the driven element tends to rotate faster than the driving element, and a second roller clutch means, roller clutch control barriers, and an axially shiftable cam actuated rockable control means provided with a friction face for selectively releasing the said barriers so as to permit the second named clutch rollers to connect the said elements in a driving relation when the driven element tends to rotate faster than the driving element.

22. A clutch device for coupling either of a pair of driving members with a driven member, comprising two unidirectional clutches, one of said clutches normally operative and the other clutch normally inoperative, means energized by the momentum of one of the driving members for causing the said normally inoperative clutch to become operative to thus permit the said clutch device to act as a bidirectional clutch, remotely controlled means for inaugurating the action of the permitting means, and a shiftable member for connecting the said clutch device with either of the said driving members.

23. In a device of the character described, the combination with driving and driven members, of a coupling for said members comprising an abutment member, a cammed member having oppositely disposed cammed surfaces and gripping members in the form of rollers cooperating therewith to act as bidirectional clutches, means in the path of the rollers of one cammed surface to prevent the operation thereof and cause the coupling members to act as a unidirectional clutch, said preventing means including an element of a friction clutch and an axially shiftable member for connecting the said friction clutch with the abutment member for causing the normally inoperative clutch to become operative to thus permit the said clutch device to act as a bidirectional clutch, and axially movable means for connecting the said clutch device with either of the said driving members.

24. In a device of the character described, the combination with a plurality of driving members and a driven member, of a coupling for said members comprising an abutment member, a cammed member having oppositely disposed cammed surfaces and gripping members in the form of rollers cooperating therewith to act as bidirectional clutches, barrier means in the path of the rollers of one cammed surface to prevent the operation thereof and cause the coupling members to act as a unidirectional clutch, and remotely controlled camming means for selectively operating the barrier means as a function of the rotation of either of the driving members to cause the coupling means to act as a bidirectional clutch.

HOWARD J. MURRAY.